Nov. 14, 1933.　　　H. KRÜSSMANN　　　1,934,766
ALTERNATING SINGLE OR MULTIPHASE CURRENT MOTOR
Filed March 12, 1931
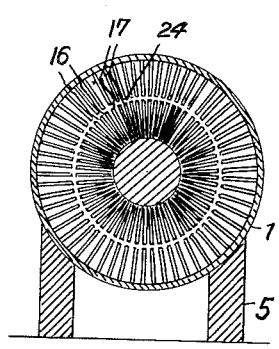
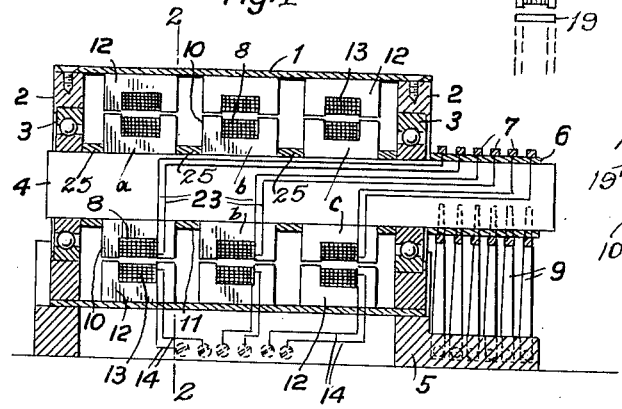
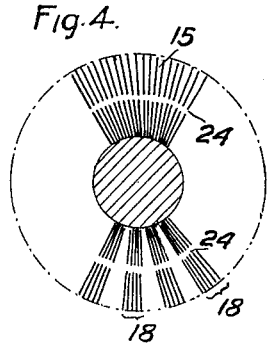
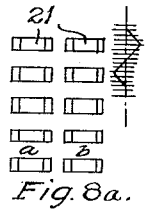
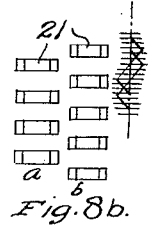
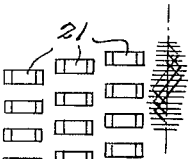
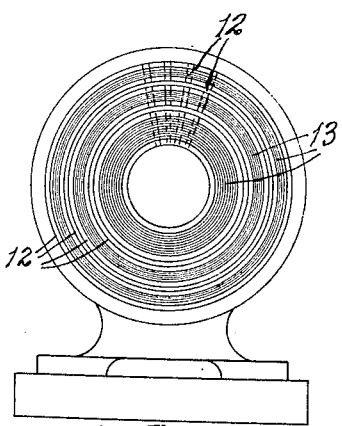
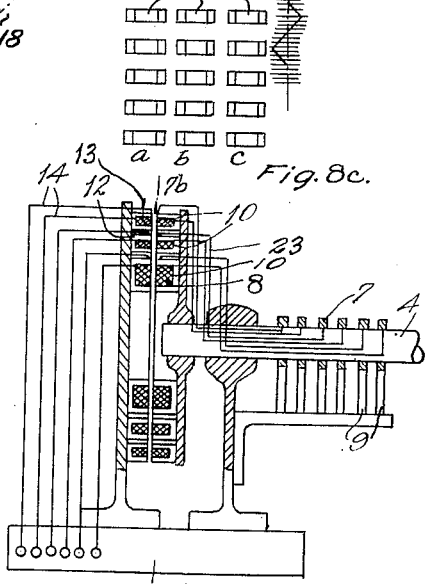
Inventor:
Hermann Krüssmann
by Bryant & Seery
atty Patented Nov. 14, 1933

1,934,766

UNITED STATES PATENT OFFICE 1,934,766

ALTERNATING SINGLE OR MULTIPHASE CURRENT MOTOR

Hermann Krüssmann, Sterkrade, Germany

Application March 12, 1931, Serial No. 522,100, and in Germany March 17, 1930

4 Claims. (Cl. 171—252)

The invention relates to a synchronous alternating current motor which consists of a stator and a rotor and has for its object to produce a synchronous alternating current motor which is of very small dimensions and of simple construction in spite of its low running speeds.

A further object of the invention is to produce an alternating current motor which is suitable both for supplying monophase and also polyphase alternating current. Alternating current motors are known which are suitable for monophase and also polyphase current. Alternating current motors are also known which run at low speeds. These known alternating current motors must however be of larger dimensions than the motor according to the invention and cannot be employed where a small diameter is desired with a low running speed.

Several embodiments of the invention illustrated by way of example in the accompanying drawing in which:—

Fig. 1 shows a longitudinal section through a motor constructed according to the invention, which can be driven by monophase and three-phase alternating current and consists substantially of three monophase current motors in a common casing with a common shaft.

Fig. 2 is a cross-section on line 2—2 of the motor shown in Fig. 1.

Fig. 3 shows diagrammatically the relative position of the neighbouring stator pole composite rims of the individual monophase motors, when the motor illustrated in Fig. 1 is supplied with threephase current, the poles being shown on an enlarged scale.

Fig. 4 is a diagrammatical cross section of Fig. 2, showing in the lower half the construction of the poles formed by packs of a plurality of thin iron sheets.

Figs. 5 and 6 show different forms of construction of the rotor and stator poles.

Fig. 7a shows a modified form of construction.

Fig. 7b is a section on line 7—7 of Fig. 7a the poles being only indicated in part.

Figs. 8a to 8d show diagrammatically the mutual position of neighbouring stator poles of motors constructed according to Fig. 1 when these motors are employed for monophase or polyphase current.

The motor illustrated in Fig. 1 consists of a casing 1 mounted on a base 5 and closed at both ends by means of plates 2 which carry bearings 3 for the motor shaft 4. The plates 2 are fixed to the casing 1 by means of screws. The stator is formed by the casing 1 on the internal circumference of which three rims of poles 12 are arranged. The poles consist of U-shaped iron elements. The open end of the U-shape is directed towards the rotation or circumferential direction, so that the successive U-shaped ends form an annular groove concentric to the motor axis. The U-arms are directed towards the rotor which in Fig. 1 is formed of U-shaped poles 10. The poles 12, as shown in Fig. 2 are arranged consecutively in close succession at uniform distances 16 apart and are of uniform thickness 17 measured in the circumferential direction. They are made of thin sheet iron plates arranged parallel to the axial line of the motor. Each pole in the example illustrated in Figs. 1 and 2 consists of a single thin plate. If a greater thickness of poles is desired the poles may be formed of several plates forming a pack as shown at 18 in the lower half of Fig. 4, the sheet metal surface being directed towards the circumferential or movement direction. In the motor according to the invention the employment of iron plates presents the particular advantage that in the motor constructed according to the invention each pole may be formed of a thin sheet metal plate so that, when employing very thin iron plates owing to the possibility of arranging a very large number of poles, a very slow motor having very small external dimensions can be constructed. The distance 16 between the poles is filled with non-magnetic material, so that the poles form with the non-magnetic material a ring which is inserted in the stator casing. Between the arms of the poles 12 a solenoid-like ring winding 13 coaxial to the rotor axis is arranged at each rim of poles, which windings are fed with alternating current through the wires 14. When fed with current each arm of each pole forms a separate pole. Opposite each rim of poles of the stator a rim of poles 10 is arranged to form the rotor. These rotor poles, as shown in Fig. 2, are provided in the same number and with the same circumferential distribution as the poles of the stator. Each stator pole corresponds to a rotor pole. In the example illustrated in Fig. 1 the rotor poles are also of U-shape and form an annular groove coaxial to the rotor axis, and open on the side directed towards the stator. Between the arms of the rotor poles a ring winding is provided in each rim concentric to the motor axis, and supplied with alternating current. The supply is effected from the same source of current which supplies the windings 13 of the stator. The windings 8 are connected by means of the wires 23 to the slip rings 7 which are provided on the sleeve 6. The current supply to the slip rings 7 is effected by brushes 9. When driving the motor illustrated in Figs. 1 and 2 both the windings 13 of the stator and also the windings 8 of the rotor are connected to the supply main and supplied with alternating current from the same source of supply. The spacing 16 between the sheet metal strips forming the rotor poles is filled with non-magnetic material so that the poles with the non-magnetic material form a ring which is slipped on to the shaft 4. The mutual spacing of the pole rings of the motor is maintained by the spacing sleeves 25.

The spacing 16 of the consecutive rotor poles measured in the circumferential direction and the spacing of the consecutive stator poles measured in the circumferential direction is greater at the boundary line 24 between the stator poles and the rotor poles than the thickness 17 of the rotor poles also measured in the circumferential direction.

As shown in Fig. 5 the rotor pole pieces 19 may also be made in rod shape. In this instance a ring winding axially concentric to the motor axis is provided only between the arms of the U-shaped stator poles. In Fig. 5 the winding is indicated beside the stator pole illustrated.

In Fig. 6 the stator poles are designated by 19' and made in rodshape, whereas the rotor poles are of U-shape and carry the axially concentric winding indicated in the drawing.

In Figs. 5 and 6 the entire motor is not shown as the figures are intended merely to indicate the possible shapes of the stator and rotor poles.

A motor constructed in the manner described may for example run at 30 R. P. M. with 50 cycles and with a pole thickness of 0.019" (0.5 mms.) measured in the circumferential direction and have an armature diameter of only about 3.84" (100 mms.).

In the motor illustrated in Fig. 1 each rim of stator poles with its rim of rotor poles forms a single motor which can be driven by monophase alternating current. The motor illustrated in Fig. 1 therefore consists of three monophase motors $a$, $b$, $c$ arranged in a common casing and provided with a common shaft. The motor may be driven both with monophase and also with three phase alternating current. If the motor is driven with monophase alternating current the poles of neighbouring pole rims $a$, $b$, $c$ are mutually arranged as shown in Fig. 8c and the windings of each pole rim are connected in parallel to the supply main. The phase diagram of the current is illustrated at the side. If however the motor is to be driven by three phase current, the neighbouring pole rims either of the stator or of the rotor must be turned a fraction of the circumferential pitch formed by the poles, the distance depending upon the number of phases, that is with three phase current by ⅓ of the circumferential pitch. In other words the turning of neighbouring pole rims amounts spatially to 360 electrical degrees divided by the number of phases. The phase diagram of three phase current at the side of Fig. 8d shows that, owing to the turning, neighbouring single pole piece 21, exactly as in the case of monophase supply with nondisplaced pole rims (see the individual poles 21 in Fig. 8c), are always at the same time under the influence of the apices of the current flow. Consequently the manner of operation of the motor with three phase current supply is the same as with monophase current supply. The winding is not shown in Figs. 8c and 8d.

Fig. 3 also shows the mutual displacement of neighbouring pole rims. It designates the axial line, relative to which the displacement is effected.

Figs. 8a and 8b show the mutual positions of neighbouring pole rims of a motor intended for two phase alternating current with a monophase or two phase current supply. A motor for two phase current supply is not shown in detail as it possesses the same construction as a motor for three phase current supply, only two stator pole rims and two rotor pole rims being provided instead of three. A motor for monophase current is likewise not shown. Such a motor has a single rim of stator poles and a single rim of rotor poles.

A multiple phase current motor of the construction above described can be employed as a single phase current motor by displacing a pole rim for each phase, for example the pole rims illustrated in Fig. 8d are displaced into the position shown in Fig. 8c, and by turning back the pole rims can be converted into a multiple phase current motor. The conversion has no effect on the speed of rotation which is determined by the current alternations per minute divided by the number of poles.

The displaceability of the pole rims may for example be effected in that the stator pole rims are merely pushed into the casing to sit tightly thereon, so that by employing the necessary force a displacement is possible.

In the motor illustrated in Figs. 7a and 7b the stator and rotor are arranged side by side. The solenoid like ring windings 8 and 13 lie between the arms of the poles 10 and 12. In this example the poles may also have the shapes illustrated in Figs. 5 and 6. If the motor in the last mentioned form of construction is to be employed only for monophase or for two phase current it has only one rim of stator poles and a rim of rotor poles opposite same or two rims of stator poles and two rims of rotor poles opposite thereto.

The motor according to the invention can be constructed with any desired number of poles.

I claim:

1. A synchronous alternating current motor with stator and rotor, in which the stator comprises a rim of U-shaped poles arranged in close succession at uniform distances apart with the aperture in the direction of movement and their arms directed towards the rotor, and a solenoid-like ring winding concentric to the motor axis, adapted to be supplied with alternating current to magnetize said stator poles, and in which the rotor comprises a plurality of poles corresponding in number and opposite to and in the same circumferential arrangement as said stator poles, the distance between neighbouring rotor poles and neighbouring stator poles measured on the boundary line between the stator poles and the rotor poles is greater than the thickness of the rotor poles measured in the circumferential direction, the stator poles and the rotor poles being made of sheet metal plates with the surface directed towards the circumferential direction.

2. A synchronous alternating current motor as specified in claim 1 in which the rotor poles are also formed of U-shaped metal plates with surface directed towards the direction of movement and arms directed towards the stator and a solenoid-like ring winding axially concentric to the motor axis is provided between the arms of the U-shaped metal plates, said winding being connected to the same source of alternating current as the stator winding.

3. A synchronous alternating current motor as specified in claim 1 for multiple phase current, comprising several single phase alternating current motors according to claim 1 and corresponding to the number of phases of the current, a common shaft carrying said motors, the neighbouring stator pole rims being mutually displaced through a fraction of the circumferential pitch formed by the poles corresponding to the number of phases.

4. A synchronous alternating current motor as specified in claim 1 for three phase current, comprising a common shaft, three motors as specified in claim 1 mounted on said shaft with displaced pole rims, adapted to operate with monophase current with nondisplaced pole rims connected in parallel and to be connected to operate with three phase current with pole rims mutually displaced through 120 electrical degrees and each connected to one of the three phases of the current.

HERMANN KRÜSSMANN.